(12) United States Patent
Nigam

(10) Patent No.: US 10,068,032 B2
(45) Date of Patent: Sep. 4, 2018

(54) SELECTIVE INDEXING TO IMPROVE COMPLEX QUERYING OF ONLINE PROFESSIONAL NETWORK DATA

(71) Applicant: LinkedIn Corporation, Mountain View, CA (US)

(72) Inventor: Abhishek Nigam, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 778 days.

(21) Appl. No.: 14/524,933

(22) Filed: Oct. 27, 2014

(65) Prior Publication Data

US 2016/0092584 A1 Mar. 31, 2016

Related U.S. Application Data

(60) Provisional application No. 62/057,879, filed on Sep. 30, 2014.

(51) Int. Cl.
*G06F 17/00* (2006.01)
*G06F 17/30* (2006.01)

(52) U.S. Cl.
CPC .. *G06F 17/30958* (2013.01); *G06F 17/30336* (2013.01)

(58) Field of Classification Search
CPC ......... G06F 17/30958; G06F 17/30961; G06F 17/30967; G06Q 10/1053; G06Q 50/01
See application file for complete search history.

(56) References Cited

U.S. PATENT DOCUMENTS

| 7,788,260 B2 * | 8/2010 | Lunt ................. G06F 17/30864 707/727 |
| 8,103,679 B1 * | 1/2012 | Cranfill ............. G06F 17/30702 707/750 |

(Continued)

OTHER PUBLICATIONS

Smriti Bhagat, Graham Cormode, Balachander Krishnamurthy, and Divesh Srivastava, "Class-Based Graph Anonymization for Social Network Data", Journal Proceedings of the VLDB Endowment, vol. 2, Issue 1, Aug. 2009, pp. 766-777.*

(Continued)

*Primary Examiner* — Cheryl Lewis
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a query containing two or more hops in a graph of online professional network data and one or more predicates containing one or more attributes of the online professional network data. The graph includes nodes representing members and companies, and a set of edges representing relationships between pairs of nodes. The query also includes two or more input nodes, including a first input member and/or an input company, that are used to form a path containing the two or more hops, along with an output that matches the one or more predicates and includes one or more output members. Next, the system executes the query to obtain a subset of the online professional network data matching the query. Finally, the system provides the subset of the online professional network data in response to the query.

19 Claims, 7 Drawing Sheets

(56) References Cited

U.S. PATENT DOCUMENTS

| | | | | |
|---|---|---|---|---|
| 8,443,005 B1* | 5/2013 | Goldman | ............... | G06Q 50/01 |
| | | | | 707/798 |
| 8,892,651 B1* | 11/2014 | Goldman | ............... | G06Q 50/01 |
| | | | | 705/319 |
| 9,330,138 B1* | 5/2016 | Shankar | ............ | G06F 17/30427 |
| 9,355,157 B2* | 5/2016 | Mohammed | ...... | G06F 17/30554 |
| 2015/0379535 A1* | 12/2015 | Wang | ................. | G06Q 30/0204 |
| | | | | 705/7.33 |
| 2016/0259848 A1* | 9/2016 | Mohammed | ...... | G06F 17/30554 |

OTHER PUBLICATIONS

William M. Campbell, Charlie K. Dagli, and Clifford J. Weinstein, "Social Network Analysis with Content and Graphs", Lincoln Laboratory Journal, vol. 20, No. 1, 2013, pp. 62-81.*

Chun Chun, Feng Li, Beng Chin Ooi, and Sai Wu, "TI: An Efficient Indexing Mechanisim for Real-Time Search on Tweets", SIGMOD'11, Jun. 12-16, 2011, copyright 2011, ACM, pp. 649-660.*

\* cited by examiner

SELECTIVE INDEXING TO IMPROVE COMPLEX QUERYING OF ONLINE PROFESSIONAL NETWORK DATA

This application claims priority under 35 U.S.C. § 119(e) to U.S. Provisional Application Ser. No. 62/057,879, entitled "Selective Indexing to Improve Complex Querying of Online Professional Network Data," by inventor Abhishek Nigam, filed on Sep. 30, 2014, the contents of which are herein incorporated by reference.

BACKGROUND

Field

Related Art

Social networks may include nodes representing individuals and/or organizations, along with links between pairs of nodes that represent different types and/or levels of social familiarity between the nodes. For example, two nodes in a social network may be connected as friends, acquaintances, family members, and/or professional contacts. Social networks may further be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, social networks and/or online professional networks may facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. To fully leverage the online professional network in conducting business activities, the individuals and/or organizations may perform complex queries of the online professional network. For example, a sales professional may identify sales prospects by searching the online professional network for a chain of individuals and/or organizations that can be used to connect the sales professional to the sales prospects.

However, complex querying of social and/or online professional network data may be time- and/or resource-intensive. For example, a query that finds possible paths between two nodes in the online professional network may require a scan of all links between individuals and/or organizations that may be used to form a path connecting the nodes, with the number of links to be scanned increasing exponentially with the number of hops in the path. Moreover, a subset of the individuals and/or organizations may have a significantly larger than average number of links to other individuals and/or organizations, resulting in the added consumption of computational resources and/or time during execution of the query if the individuals and/or organizations are included in the search space of the query.

Consequently, querying of social and/or online professional networks may be facilitated by mechanisms for improving the performance of complex queries of social and/or online professional network data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
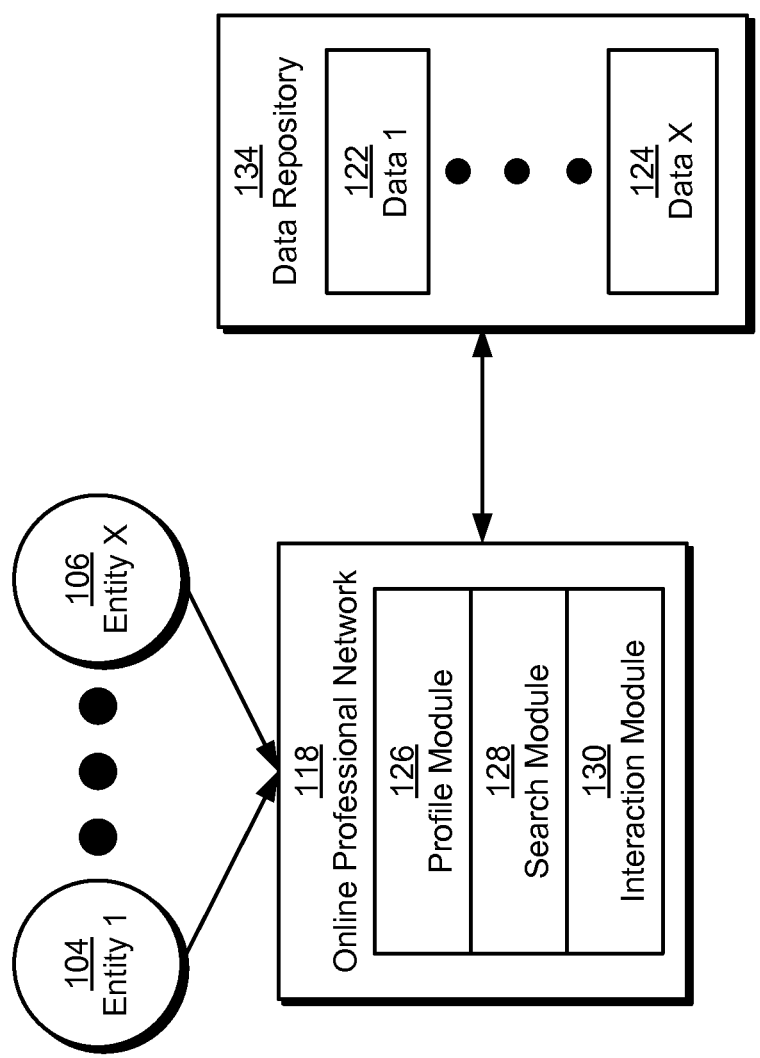
FIG. 1 shows a schematic of a system in accordance with the disclosed embodiments.

The disclosed embodiments provide a method and system for processing data. More specifically, the disclosed embodiments provide a method and system for facilitating the processing of queries of online professional network data. As shown in FIG. 1, an online professional network 118 may be used by a set of entities (e.g., entity 1 104, entity x 106) to interact with one another in a professional and/or business context.

For example, the entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in online professional network 118.

Next, the entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest postings, articles, and/or updates from the entities' connections and/or groups to the entities. Similarly, online professional network 118 may include mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
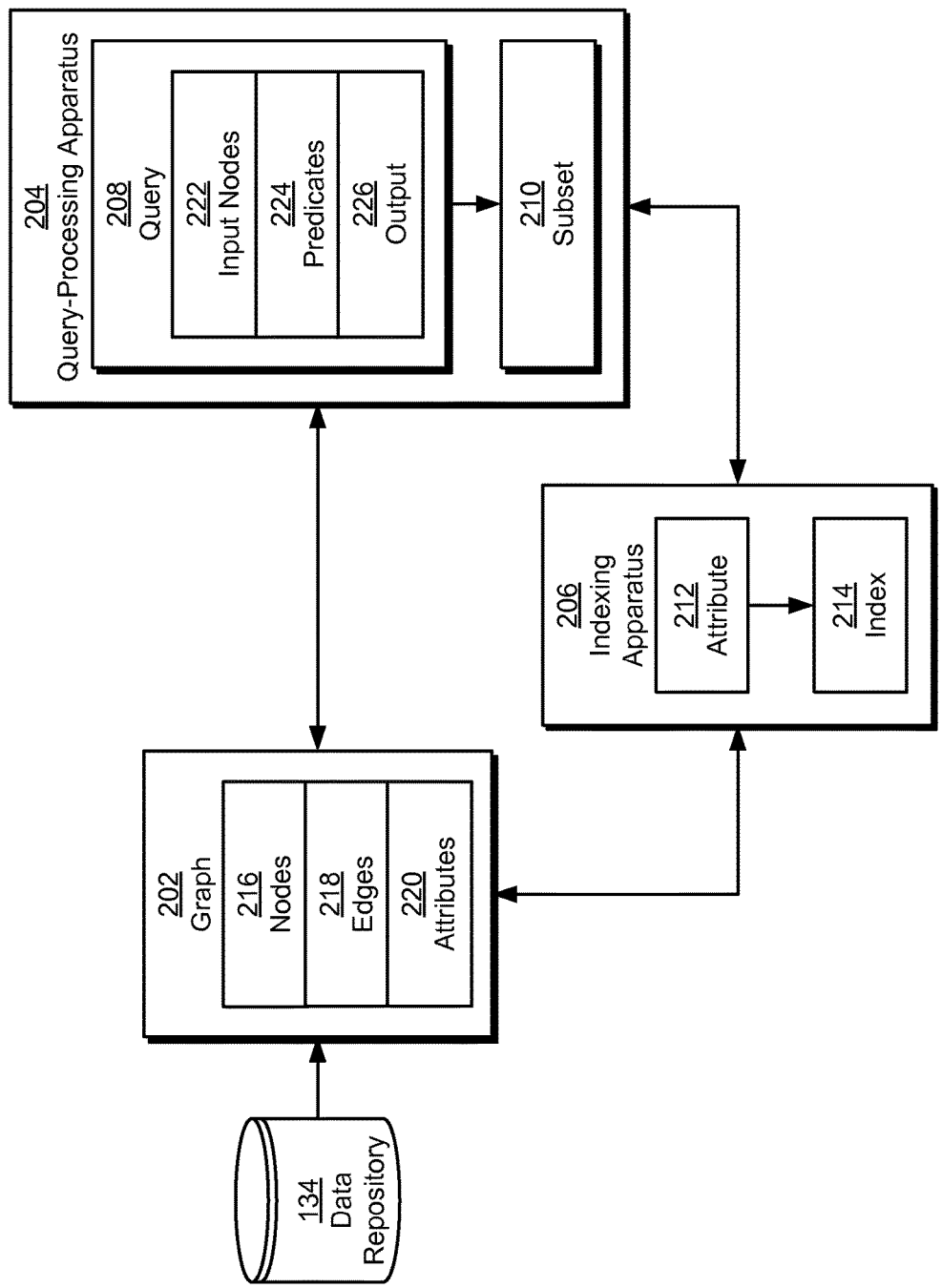
FIG. 2 shows a system for processing online professional network data in accordance with the disclosed embodiments.

As shown in FIG. 2, data in data repository 134 may be used to form a graph 202 of online professional network data representing entities and the entities' relationships and/or activities in an online professional network, such as online professional network 118 of FIG. 1. Graph 202 may include a set of nodes 216, a set of edges 218, and a set of attributes 220.

Nodes 216 in graph 202 may represent entities in the online professional network. For example, the entities represented by nodes 216 may include individual members (e.g., users) of the online professional network, groups joined by the members, and/or organizations such as schools and companies. Nodes 216 may also represent other objects and/or data in the online professional network, such as industries, locations, posts, articles, multimedia, job listings, ads, and/or messages.

Edges 218 may represent relationships and/or interaction between pairs of nodes 216 in graph 202. For example, edges 218 may be directed and/or undirected edges that specify connections between pairs of members, education of members at schools, employment of members at organizations, business relationships and/or partnerships between organizations, and/or residence of members at locations. Edges 218 may also indicate actions taken by entities, such as creating or sharing articles or posts, sending messages, connection requests, joining groups, and/or following other entities.

Nodes 216 and edges 218 may also contain attributes 220 that describe the corresponding entities, objects, associations, and/or relationships in the online professional network. For example, a node representing a member may include attributes 220 such as a name, username, password, and/or email address. Similarly, an edge representing a connection between the member and another member may have attributes 220 such as a time at which the connection was made, the type of connection (e.g., friend, colleague, classmate, etc.), and/or a strength of the connection (e.g., how well the members know one another).

Online professional network data in graph 202 may be accessed through a query-processing apparatus 204. For example, query-processing apparatus 204 may be used to read and write data in graph 202 during use of the online professional network by a set of users. Query-processing apparatus 204 may read from graph 202 during loading of profiles, job postings, articles, and/or other online professional network data from data repository 134 in a website and/or application for accessing the online professional network. Query-processing apparatus 204 may write to graph 202 to update graph 202 with recent activity and/or information such as a new job posting, profile update, article, comment, like, and/or share.

To obtain data from graph 202, a query 208 may be submitted to query-processing apparatus 204, and query-processing apparatus 204 may process query 208 by scanning graph 202 for one or more nodes 216, edges 218, and/or attributes 220 matching query 208. For example, a user may use a search module (e.g., search module 128 of FIG. 1) to create and submit query 208 to query-processing apparatus 204. Query-processing apparatus 204 may obtain one or more keywords and/or categories from query 208 and search graph 202 for a subset 210 of nodes 216, edges 218, attributes 220, and/or other online professional network data matching query 208. Query-processing apparatus 204 may then provide subset 210 in response to query 208 by displaying subset 210 within a user interface of the online professional network (e.g., the search module) and/or outputting subset 210 to a file.

In one or more embodiments, query-processing apparatus 204 includes functionality for performing complex querying of online professional network data in graph 202, such as querying that involves two or more hops in graph 202. For example, query-processing apparatus 204 may support searching of three- or four-hop paths in graph 202 for members, schools, and/or companies that can be used to connect two members in the online professional network.

As shown in FIG. 2, query 208 may be a complex query containing one or more input nodes 222, one or more predicates 224, and an output 226. Input nodes 222 may include one or more nodes 216 from graph 202. For example, input nodes 222 may include members, companies, schools, groups, and/or other nodes. Predicates 224 may include filters that restrict the possible values of one or more attributes 220 in subset 210. For example, query 208 may include a predicate for employment of a member at a company and/or employment of two or more members at the same company at the same time. In another example, query 208 may include an exact match and/or a range of values for an attribute such as dates of employment, dates of education, name, and/or industry. Output 226 may specify one or more nodes 216, edges 218, and/or attributes 220 that match predicates 224. For example, output 226 may include one or more members that are related, directly or indirectly, to input nodes 222 and match the filters specified in predicates 224. Complex queries of graphs of online professional network data are discussed in further detail below with respect to FIGS. 3A-3E.

Those skilled in the art will appreciate that execution of query 208 and/or other complex queries of graph 202 may require significantly more time and/or computational resources than simpler queries that contain two or fewer hops in graph 202. For example, a query (e.g., query 208) that finds all possible paths between two nodes in the online professional network may require a scan of all edges that may be used to form a path connecting the nodes. The number of edges to be scanned may increase exponentially with the number of hops in the query, thus effectively limiting the number of hops that can be searched in a reasonable amount of time for a given amount of processor time and/or memory usage. At the same time, nodes 216 in graph 202 may have a large variance in number of edges 218. For example, the average number of edges 218 per node in graph 202 may be in the tens to hundreds, while a subset of nodes 216 may have tens of thousands to millions of edges. Inclusion of a node with a large number of edges in the search space of the query may thus significantly increase the complexity of the query.

To improve processing of complex queries of graph 202, an indexing apparatus 206 may selectively index attributes 220 for portions of graph 202 that significantly add to the processing of the complex queries by query-processing apparatus 204. Such selective indexing may reduce the search space and associated processing of the complex queries while mitigating increases in write latency, overhead, and/or memory usage associated with building complete indexes of attributes in data sets.

As mentioned above, each query may include one or more predicates (e.g., predicates 224) that specify one or more attributes (e.g., attributes 220) for filtering data in graph 202. For example, a query may request all members who are connected to a certain member after a specified date. In turn, the query may be processed by comparing the specified date to a "date" attribute of each connection between the member and another member in the online professional network and returning only the connections with a value of "date" that exceeds the specified date. Thus, while a predicate containing the "date" attribute may reduce the result set of the query, generation of the result set may still require a comparison of all of the member's connections with the "date" attribute.

To identify a complex query with a large search space for potential indexing of the query's attributes, indexing apparatus 206 may obtain statistics associated with previously run queries on query-processing apparatus 204. For example, indexing apparatus 206 may obtain information related to queries that have been executed by query-processing apparatus 204, such as the number of times a query is run, the average number of edges searched in the query, the average processing time of the query, and/or the average processor or memory usage of the query. Indexing apparatus 206 may use the information to identify one or more queries that are generally associated with a large search space and/or significant processing or memory overhead.

Indexing apparatus 206 may then reduce the search space of the query by obtaining an attribute 212 from the query and creating an index 214 of attribute 212. Indexing apparatus 206 may then provide index 214 for use in executing the query by storing index 214 with data for graph 202 in data repository 134, loading index 214 into memory for use by query-processing apparatus 204, and/or otherwise enabling access to index 214 by query-processing apparatus 204.

For example, indexing apparatus 206 may identify a predicate containing a "date" attribute as frequently occurring in complex queries of graph 202. To improve the processing of the complex queries and/or reduce the search space of the complex queries, indexing apparatus 206 may generate a forward index (e.g., index 214) of the date attribute for edge types that are searched in the complex queries. In turn, a subsequent query that includes a predicate for an exact match for a date and/or a range of dates in one of the edge types may use the forward index to scan only the edges that match the predicate, thus reducing the amount of searching and/or processing required to execute the query.

Alternatively, indexing apparatus 206 may index attribute 212 independently of statistics associated with previously executed queries. For example, indexing apparatus 206 may analyze graph 202 and/or the querying functionality supported by query-processing apparatus 204 to identify one or more attributes 212 that are likely to be used in complex queries of graph 202. Indexing apparatus 206 may then index the identified attributes to improve the subsequent execution of the complex queries by query-processing apparatus 204.

In addition, indexing apparatus 206 may selectively generate index 214 and/or other indexes of attributes 220 for a subset of nodes 216 with large numbers of edges 218 in graph 202. For example, indexing apparatus 206 may identify, from statistics associated with the queries and/or information from graph 202, a set of members in the online professional network that have more than a certain number of connections (e.g., 10,000). Indexing apparatus 206 may also identify other nodes in graph 202 with large numbers of edges, such as companies that employ large numbers of people and/or schools with many students and/or alumni. Indexing apparatus 206 may create indexes for one or more attributes of the nodes' edges so that queries that include predicates containing the attributes are not required to search and/or scan all of the edges. On the other hand, indexing apparatus 206 may omit indexing of attributes for nodes with fewer edges because the nodes contribute a relatively small amount to the complexity and/or processing times of queries of graph 202.

Consequently, the system of FIG. 2 may support the timely execution of complex queries of online professional network data in graph 202 while mitigating the memory usage and/or latency associated with indexing and/or updating graph 202. In turn, the ability to perform complex queries of data in graph 202 may increase the value of the online professional network to users of the online professional network. For example, a sales professional may perform complex queries of graph 202 to identify members who have a common background with the sales professional and can make introductions and/or recommendations that help the sales professional find leads, establish prospects, and/or conduct sales-related activities.

Those skilled in the art will appreciate that the system of FIG. 2 may be implemented in a variety of ways. First, query-processing apparatus 204, indexing apparatus 206, and/or data repository 134 may be provided by a single physical machine, multiple computer systems, one or more virtual machines, a grid, one or more databases, one or more filesystems, and/or a cloud computing system. Query-processing apparatus 204 and indexing apparatus 206 may additionally be implemented together and/or separately by one or more hardware and/or software components and/or layers.

Second, multiple instances of data repository 134, query-processing apparatus 204, and/or indexing apparatus 206 may be provided to increase fault tolerance and/or facilitate scaling associated with storing, querying, and indexing graph 202 as the use of the online professional network increases. For example, graph 202 may be stored in a number of logical partitions, with each logical partition containing a subset of nodes 216 of graph 202 and all edges 218 belonging to the subset of nodes 216. Each logical partition may be mapped to one or more physical machines, and one or more copies of the logical partition may be made to implement failover of data repository 134. Similarly, multiple instances of query-processing apparatus 204 and/or indexing apparatus 206 may execute on one or more physical and/or virtual machines to enable the timely processing of queries of graph 202 and/or improve the reliability and/or availability of query-processing apparatus 204 and/or indexing apparatus 206.

Finally, indexing apparatus 206 may use a number of techniques to generate indexes of attributes 220. As described above, indexing apparatus 206 may selectively create indexes for nodes with large numbers of edges to reduce the complexity of queries that scan the edges of the nodes without significantly increasing the memory usage and/or latency associated with creating and maintaining the indexes. Moreover, indexing apparatus 206 may use a number of indexes to expedite the queries, including forward indexes, inverted indexes, and/or hierarchical indexes. Finally, indexing apparatus 206 may create indexes of one or more attributes 220 before, during, or after querying of graph 202 using the attributes.

Figure 3A:
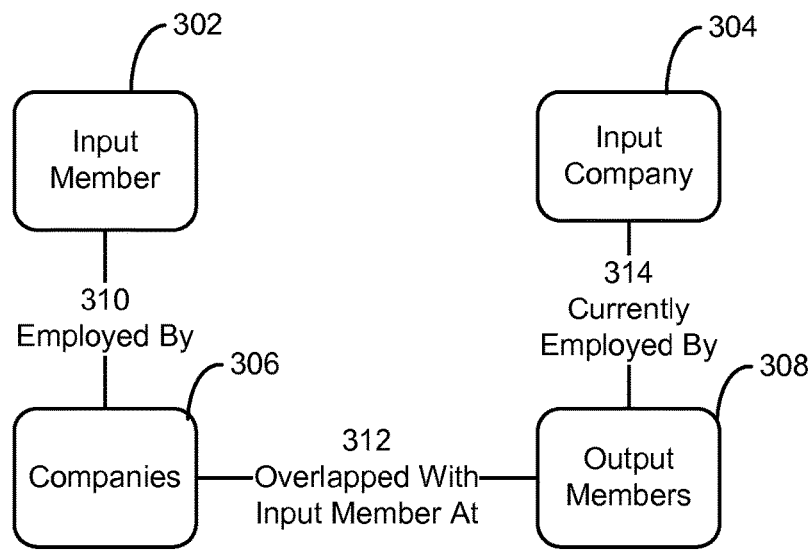
FIG. 3A shows an exemplary query of online professional network data in accordance with the disclosed embodiments.

FIG. 3A shows an exemplary query of online professional network data in accordance with the disclosed embodiments. More specifically, FIG. 3A shows a complex query of a graph of online professional network data, such as graph 202 of FIG. 2. As discussed above, the complex query may include two or more hops in the graph, one or more predicates containing one or more attributes of the online professional network data, a number of input nodes, and/or an output that matches the predicate(s).

The query of FIG. 3A includes four nodes 302-308 and three predicates 310-314 that form three hops in a path containing nodes 302-308. Nodes 302-308 include two input nodes 302-304 representing an input member and an input company, respectively. Nodes 302-308 also include an output node 308 representing one or more output members, as well as a fourth node 306 representing one or more companies 306 used in the query.

Predicates 310-314 are related to attributes of edges between pairs of the nodes. Predicate 310 (e.g., "Employed By") links nodes 302 and 306, predicate 312 (e.g., "Overlapped With Input Member At") links nodes 306-308, and predicate 314 (e.g., "Currently Employed By") links nodes 304 and 308. The query may thus specify a search for one or more output members who currently work at the input company and overlap in employment with (e.g., worked at the same time as) the input member at one or more companies. In other words, the query may be conducted by the input member to find ex-colleagues of the input member who currently work at the input company. For example, the query may be used by a sales professional to identify other members who can facilitate sales activity related to the input company.

Because node 306 may include a number of companies with large numbers of edges, scanning the edges of nodes 302 and 306 to find one or more output members that match predicates 310-314 may be computationally expensive. For example, the input member may have an employment history with several companies, each with hundreds to tens of thousands of employees and/or ex-employees. As a result, identifying output members that match predicates 310-312 may require the comparison of the employment dates of every member who worked at one of the companies in node 306 with the input member's employment dates for the same company.

To improve execution of the query, one or more indexes associated with the "Employed By" and/or "Overlapped With Input Member At" predicates 310-312 may be created. For example, an index may be created for the start and end dates of employees of large companies to expedite identification of a set of potential output members who overlap in employment with the input member at one or more companies. An attribute for the potential output members' current employer (e.g., "Currently Employed By") may then be scanned to filter the potential output members by predicate 314 and obtain a final set of output members that is returned in response to the query.

Figure 3B:
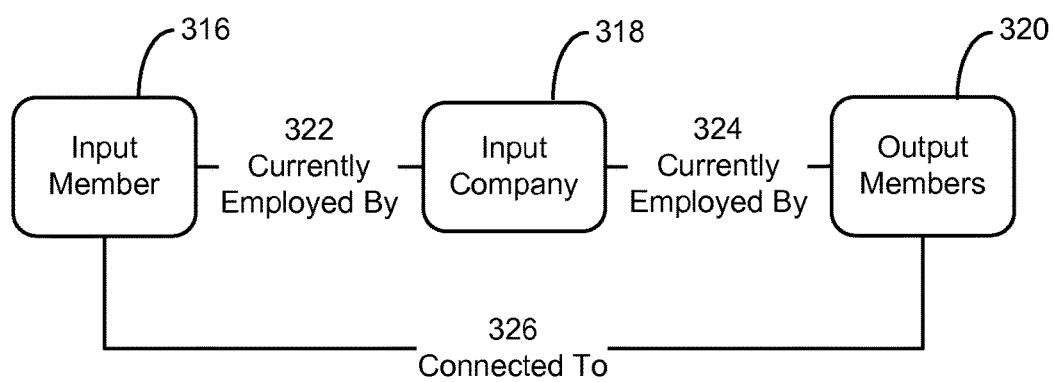
FIG. 3B shows an exemplary query of online professional network data in accordance with the disclosed embodiments.

FIG. 3B shows an exemplary query of online professional network data in accordance with the disclosed embodiments. As with the query of FIG. 3A, the query of FIG. 3B may be a complex query of a graph of online professional network data, such as graph 202 of FIG. 2.

The query of FIG. 3B includes three nodes 316-320 and three predicates 322-326 that filter nodes 316-320 by relationships among nodes 316-320. Node 316 may be an input member, node 318 may be an input company, and node 320 may represent one or more output members. Predicate 322 (e.g., "Currently Employed By") links nodes 316-318, predicate 324 (e.g., "Currently Employed By") links nodes 318-320, and predicate 326 (e.g., "Connected To") links nodes 316 and 320. Because predicate 322 is related to the inputs of the query, predicate 322 may be applied during creation of the query instead of execution of the query. For example, predicate 322 may be applied after the input member is specified to automatically set the input company to the input member's current employer. Conversely, predicate 322 may be applied after the input company is specified to generate a list of members who currently work at the input company and enable selection of the input member from the list.

The query may represent a search for output members who currently work at the same company as the input member and are connected to the input member in an online professional network. For example, the query may be used by a recruiter to identify potential hires based on their relationship to the input member and common employment with the input member.

To improve execution of the query, an index may be generated for an attribute related to predicates 324-326. For example, an index may be created on a "currently employed by" attribute of the input member's connections if the input member has a large number of connections. As a result, the index may allow the input member's connections who work at the same input company to be identified without scanning all of the input member's connections.

Figure 3C:
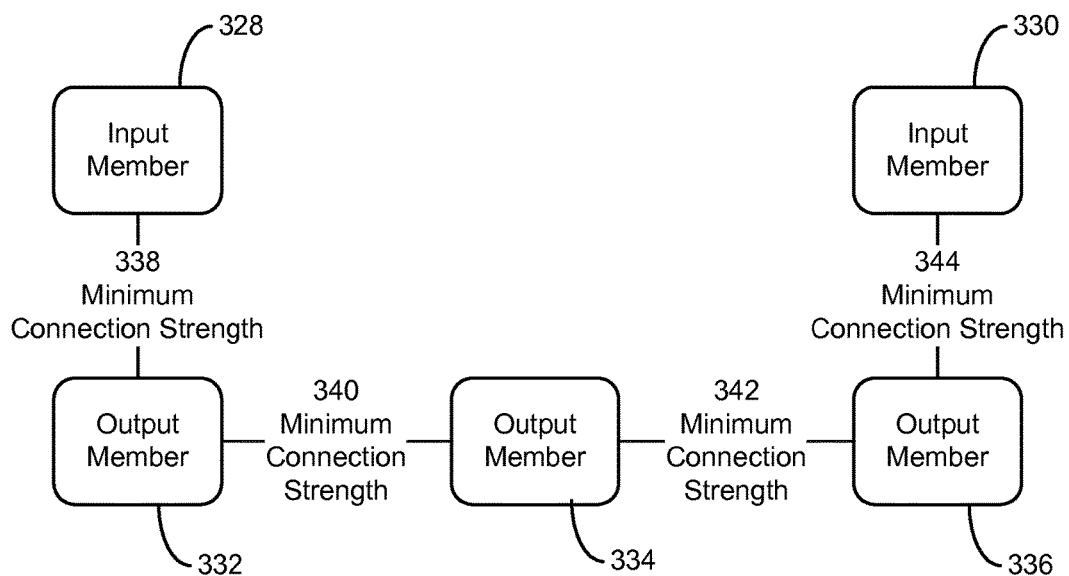
FIG. 3C shows an exemplary query of online professional network data in accordance with the disclosed embodiments.

FIG. 3C shows an exemplary query of online professional network data in accordance with the disclosed embodiments. As shown in FIG. 3C, the query includes five nodes 328-336 and four predicates 338-344. Nodes 328-336 include two input nodes 328-330 representing two input members and three output nodes 332-336 representing three output members. All four predicates 338-344 (e.g., "Minimum Connection Strength") may specify the same attribute and form a four-hop path between nodes 328-330. As a result, the query may be a complex query that searches the online professional network data for four-hop paths between the input members, with the restriction that each of the connections between members in the paths meets a minimum connection strength.

For example, each connection between a pair of members in an online professional network may be associated with a connection strength, which is a measure and/or estimate of the strength of the relationship between the members. The connection strength may be higher for members who are or have been colleagues or friends (and therefore have a relatively high level of interaction) and lower for members who have no known common background (and therefore have relatively low levels of interaction). The minimum connection strength in predicates 338-334 may thus be used to identify the four-hop paths that link the input members through a series of reasonably strong connections. For example, the query may facilitate introductions between the input members through the stronger relationships among the input members and output members.

Because the query includes four hops, the search space of the query may be as high as the fourth power of the branching factor associated with notes 328-336. In turn, inclusion of nodes with large numbers of connections in the search space may significantly increase the amount of processing required to execute the query. To reduce the complexity of the query, connections of members may be indexed by connection strength so that connections that do not satisfy predicates 338-344 are not searched in the query. Moreover, such indexing may be selectively performed for members with significantly more connections than average to target nodes with edges that contribute significantly to the complexity of the query and prevent the nodes from causing performance issues during execution of the query.

Figure 3D:
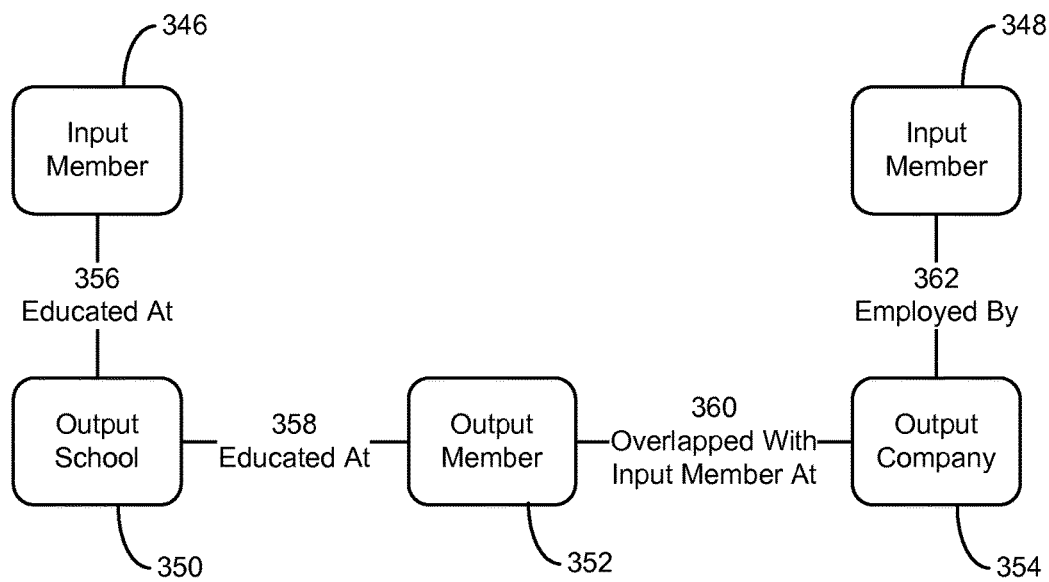
FIG. 3D shows an exemplary query of online professional network data in accordance with the disclosed embodiments.

FIG. 3D shows an exemplary query of online professional network data in accordance with the disclosed embodiments. As with the query of FIG. 3C, the query of FIG. 3D includes five nodes 346-354 and four predicates 356-362 that form a four-hop path linking nodes 346-354. Nodes 346-354 may include two input nodes 346-348 representing two input members and three output nodes 350-354 representing an output school, an output member, and an output company, respectively. Predicate 356 (e.g., "Educated At") may link nodes 346 and 350, predicate 358 (e.g., "Educated At") may link nodes 350-352, predicate 360 (e.g., "Overlapped with Input Member At") may link nodes 352-354, and predicate 362 (e.g., "Employed By") may link nodes 348 and 354.

Predicates 356-362 may place a number of constraints on the output school, member, and company. For example, predicates 356-362 may require the identification of the output school, member, and company such that the output member shares a common education with a first input member represented by input node 346 at the output school and overlaps in employment with a second input member represented by input node 348 at the output company. In turn, the query may be performed to identify an output member who can introduce the first input member to the second input member for recruiting, sales, marketing, and/or job-seeking purposes.

Because the query has four hops, the search space of the query may be large enough to cause performance issues, particularly with the inclusion of members, schools, and/or companies with large numbers of edges in the search. To reduce the search space and/or mitigate the performance issues, indexes may be created for attributes associated with predicates 356-358 and/or predicates 360-362. For example, an index may be created on an "employed by" attribute of the edges connecting a school to a set of members to facilitate rapid identification of members who were educated at the school and worked at a certain company. Conversely, an index may be created on an "educated at" attribute of the edges connecting a company to a set of members to facilitate rapid identification of members employed by the company who were educated at a given school.

Figure 3E:
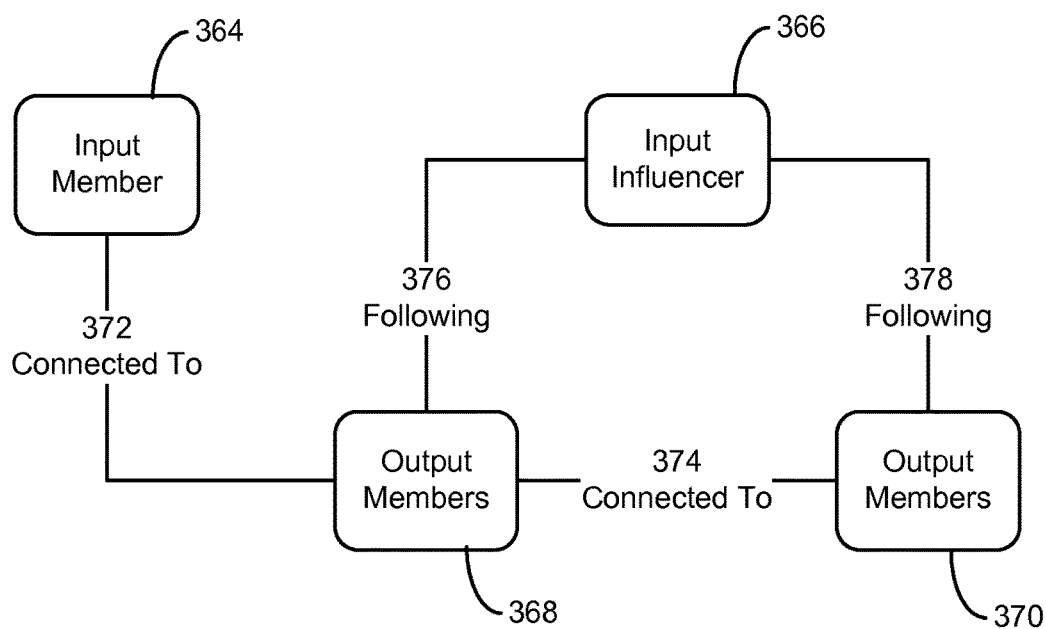
FIG. 3E shows an exemplary query of online professional network data in accordance with the disclosed embodiments.

FIG. 3E shows an exemplary query of online professional network data in accordance with the disclosed embodiments. The query includes four nodes 364-370 and four predicates 372-378 linking nodes 364-370. Nodes 364-366 may be input nodes that represent an input member and an input influencer, respectively. The input influencer may be an industry leader and/or other prominent member of an online professional network who publishes content to the online professional network. Members and/or other entities in the online professional network may follow the input influencer to receive updates containing published content from the input influencer.

Nodes 368-370 may represent one or more output members. Predicates 372-374 (e.g., "Connected To") may form a two-hop path containing nodes 364 and 368-370. As a result, predicates 372-374 and nodes 364 and 368-370 may identify a second-degree network of the input member (e.g., all members that are up to two degrees of separation from the input member). Predicates 376-378 (e.g., "Following") may link nodes 368-370 to node 366 and filter the output members to include only followers of the input influencer. In other words, the query may search for output members in the second-degree network of the input member who follow the input influencer.

To facilitate execution of the query, an index associated with predicates 372-378 may be generated. For example, an index may be created on a "following" attribute of the second-degree connections of the input member to enable identification of the input member's second-degree connections who follow the input influencer without scanning all of the input member's second-degree connections. The index may also be created only if the input member's second-degree network exceeds a certain size.

Figure 4:
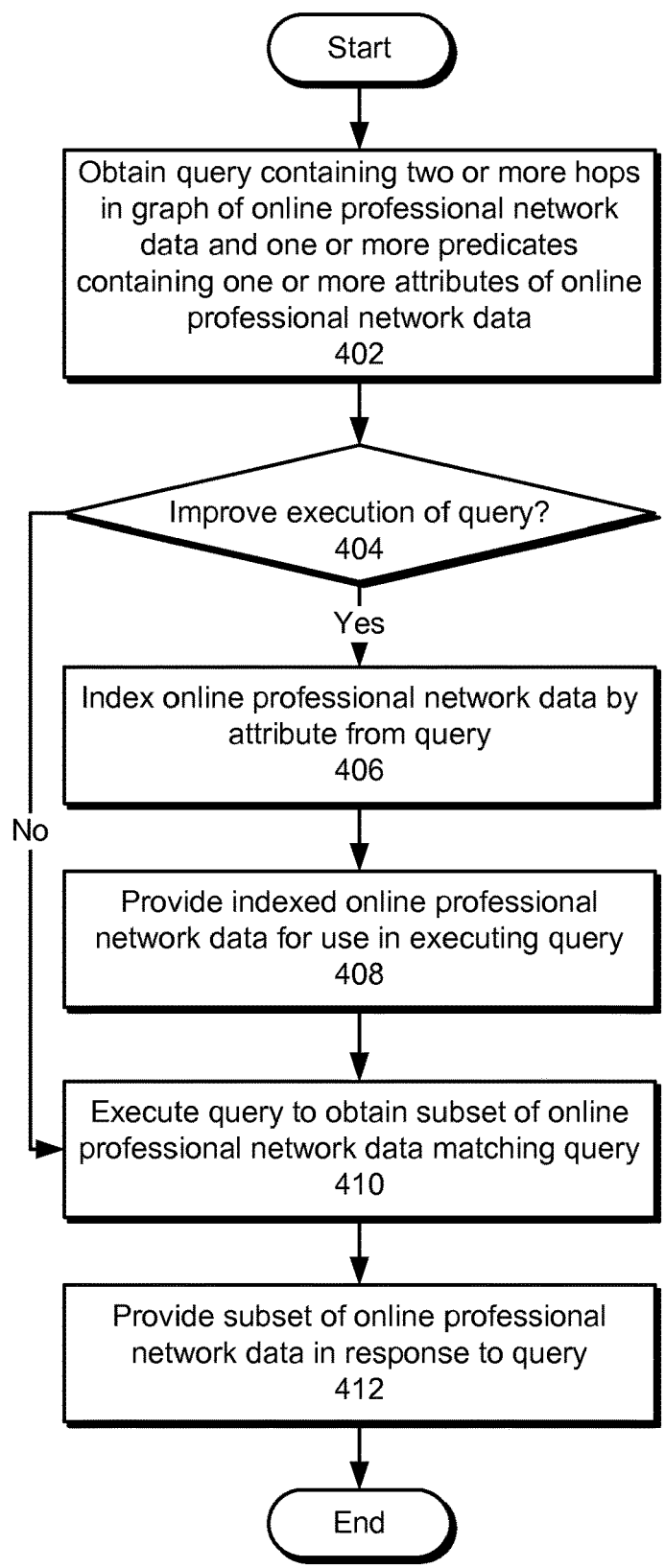
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a query is obtained, which contains two or more hops in a graph of online professional network data and one or more predicates containing one or more attributes of the online professional network data (operation 402). The online professional network data may include a set of nodes representing members, companies, schools, and/or other entities in an online professional network. The online professional network data may also include a set of edges representing relationships between pairs of nodes in the set of nodes.

Next, the execution of the query may be improved (operation 404). For example, the execution of the query may be improved if the query is associated with a large search space, high latency, and/or significant processor or memory usage. If the execution of the query is to be improved, the online professional network data is indexed by an attribute from the query (operation 406). Such indexing of the online professional network data may be selectively performed to balance the tradeoff between memory occupied by the index and the performance enhancement provided by the index. For example, an index of the attribute may be created for nodes with large numbers of edges in the graph (e.g., greater than a threshold) and omitted for nodes with smaller numbers of edges in the graph (e.g., less than the threshold).

Once the indexing is complete, the indexed online professional network data is provided for use in executing the query (operation 408). For example, one or more indexes of the attribute may be stored with the online professional network data and/or made available during querying of the online professional network data.

If execution of the query does not need to be improved, no indexing may be performed. For example, indexing of the online professional network data may be omitted if one or more indexes of the online professional network data have already been created and/or the search space and/or computational costs of the query are manageable.

The query is then executed to obtain a subset of the online professional network data matching the query (operation 410). For example, the query may be executed by scanning the nodes and/or edges of the graph to find the subset of the online professional network data that matches the query. If an index associated with a predicate of the query is available, the index may be used to accelerate and/or otherwise improve execution of the query. Finally, the subset of the online professional network data is provided in response to the query (operation 412). For example, the subset of the online professional network data may be displayed as a set of search results and/or outputted to a file.

Figure 5:
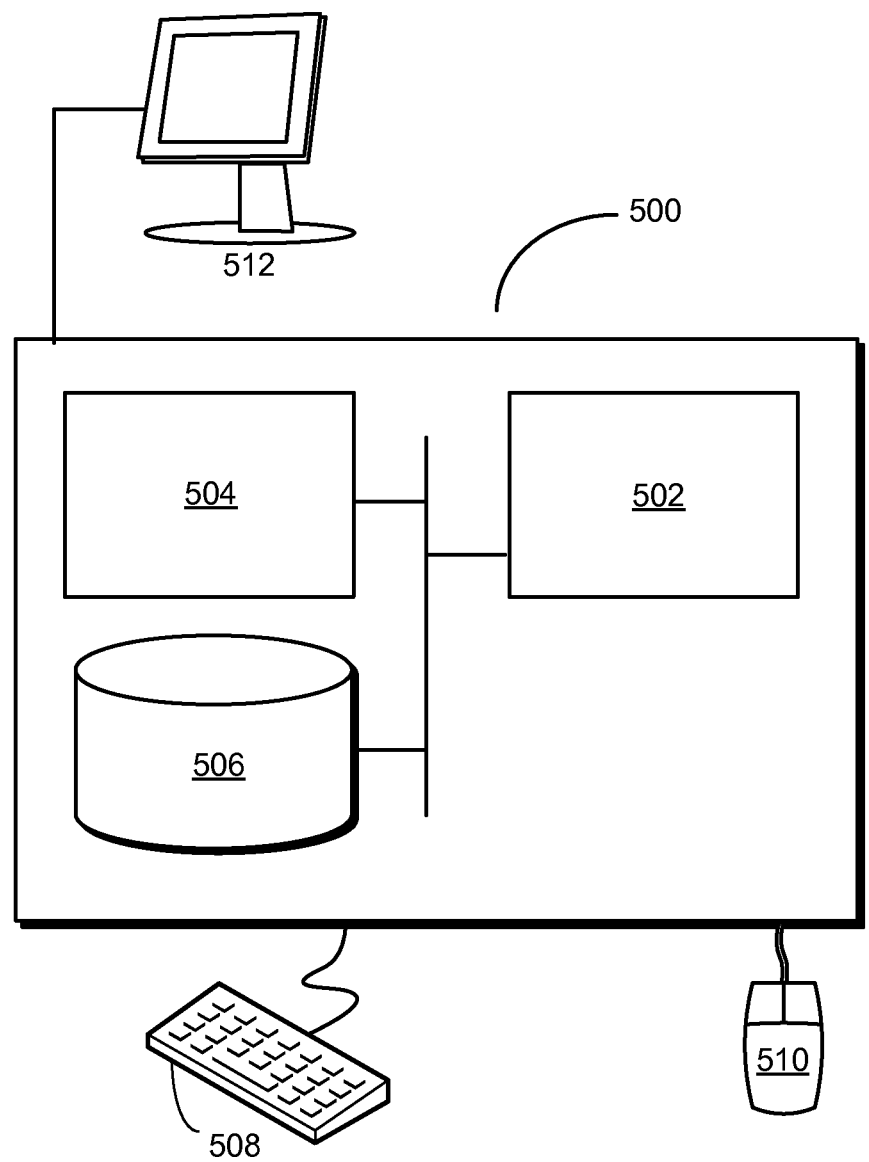
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include a query-processing apparatus that obtains a query, which contains two or more hops in a graph of online professional network data and one or more predicates comprising one or more attributes of the online professional network data. The graph may include a set of nodes containing members, companies, and schools and a set of edges representing relationships between pairs of nodes. Next, the query-processing apparatus may execute the query to obtain a subset of the online professional network data matching the query and provide the subset of the online professional network data in response to the query. The system may also include an indexing apparatus that indexes the online professional network data by an attribute from the query and provides the indexed online professional network data for use in executing the query.

In addition, one or more components of computer system 500 may be remotely located and connected to the other components over a network. Portions of the present embodiments (e.g., query-processing apparatus, indexing apparatus 206, online professional network data, etc.) may also be located on different nodes of a distributed system that implements the embodiments. For example, the present embodiments may be implemented using a cloud computing system that performs complex querying of a graph of online professional network data by a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing data, comprising:
   obtaining, at a computer, a query comprising:
      two or more hops in a graph of online user community data, wherein the graph comprises:
         a set of nodes comprising members and companies; and
         a set of edges representing relationships between pairs of nodes in the set of nodes;
      one or more predicates comprising one or more attributes of the online user community data;
      two or more input nodes, including one or more of a first input member and an input company, that are used to form a path comprising the two or more hops; and
      an output that matches the one or more predicates and comprises one or more output members;
   indexing selectively, by the computer, the online user community data by an attribute from the query, wherein said indexing comprises:
      identifying the attribute based on a search space of the query;
      creating an index of the attribute for a first node having a number of edges that exceeds a threshold to reduce the search space of the query; and
      omitting from the index a second node having a number of edges less than the threshold;
   executing, by the computer, the query to obtain a subset of the online user community data matching the query; and
   providing the subset of the online user community data in response to the query.

2. The method of claim 1, further comprising:
   providing the indexed online user community data for use in executing the query.

3. The method of claim 1, wherein the one or more predicates comprise:
   an employment of the one or more output members at the input company; and an overlap of employment at a common company between the first input member and the one or more output members.

4. The method of claim 1, wherein the one or more predicates comprise:
an employment of the first input member and the one or more output members at the input company; and
a connection of the first input member to the one or more output members.

5. The method of claim 1, wherein:
the two or more input nodes comprise the first input member and a second input member;
the output comprises members in a four-hop path between the first and second input members; and
the one or more predicates comprise a minimum connection strength of edges in the four-hop path.

6. The method of claim 1, wherein:
the two or more input nodes comprise the first input member and a second input member;
the output further comprises an output school and an output company in a four-hop path between the first and second input members; and
the one or more predicates comprise:
an education of the first input member and the one or more output members at the output school; and
an employment of the second input member and the one or more output members at the output company at the same time.

7. A method of processing data, comprising:
obtaining, at a computer, a query comprising:
two or more hops in a graph of online user community data, wherein the graph comprises:
a set of nodes comprising members and companies; and
a set of edges representing relationships between pairs of nodes in the set of nodes;
one or more predicates comprising one or more attributes of the online user community data;
two or more input nodes, including an input member and an input influencer, that are used to form a path comprising the two or more hops; and
an output that matches the one or more predicates and comprises a set of output members;
indexing selectively, by the computer, the online user community data by an attribute from the query, wherein said indexing comprises:
identifying the attribute based on a search space of the query;
creating an index of the attribute for a first node having a number of edges that exceeds a threshold to reduce the search space of the query; and
omitting from the index a second node having a number of edges less than the threshold;
executing, by the computer, the query to obtain a subset of the online user community data matching the query; and
providing the subset of the online user community data in response to the query.

8. The method of claim 7, wherein the one or more predicates comprise:
membership of the set of output members in a second-degree network of the input member; and
following of the input influencer by the set of output members.

9. The method of claim 7, further comprising:
providing the indexed online user community data for use in executing the query.

10. An apparatus, comprising:
one or more processors; and
memory storing instructions that, when executed by the one or more processors, cause the apparatus to:
obtain a query comprising:
two or more hops in a graph of online user community data, wherein the graph comprises:
a set of nodes comprising members and companies; and
a set of edges representing relationships between pairs of nodes in the set of nodes;
one or more predicates comprising one or more attributes of the online user community data;
two or more input nodes, including one or more of a first input member and an input company, that are used to form a path comprising the two or more hops; and
an output that matches the one or more predicates and comprises one or more output members;
index selectively the online user community data by an attribute from the query, wherein said indexing comprises:
identifying the attribute based on a search space of the query;
creating an index of the attribute for a first node having a number of edges that exceeds a threshold to reduce the search space of the query; and
omitting from the index a second node having a number of edges less than the threshold;
execute the query to obtain a subset of the online user community data matching the query; and
provide the subset of the online user community data in response to the query.

11. The apparatus of claim 10, wherein the memory further stores instructions that, when executed by the one or more processors, cause the apparatus to:
provide the indexed online user community data for use in executing the query.

12. The apparatus of claim 10, wherein the one or more predicates comprise:
an employment of the one or more output members at the input company; and
an overlap of employment at a common company between the first input member and the one or more output members.

13. The apparatus of claim 10, wherein the one or more predicates comprise:
an employment of the first input member and the one or more output members at the input company; and
a connection of the first input member to the one or more output members.

14. The apparatus of claim 10, wherein:
the two or more input nodes comprise the first input member and a second input member;
the output comprises members in a four-hop path between the first and second input members; and
the one or more predicates comprise a minimum connection strength of edges in the four-hop path.

15. The apparatus of claim 10, wherein:
the two or more input nodes comprise the first input member and a second input member;
the output further comprises an output school and an output company in a four-hop path between the first and second input members; and
the one or more predicates comprise:
an education of the first input member and the one or more output members at the output school; and an employment of the second input member and the one or more output members at the output company at the same time.

16. A system, comprising:
one or more processors;
a query-processing non-transitory computer readable medium comprising instructions that, when executed by the one or more processors, cause the system to:
   obtain a query comprising:
      two or more hops in a graph of online user community data, wherein the graph comprises:
         a set of nodes comprising members and companies: and
         a set of edges representing relationships between pairs of nodes in the set of nodes;
      one or more predicates comprising one or more attributes of the online user community data;
      two or more input nodes, including one or more of a first input member and an input company, that are used to form a path comprising the two or more hops; and
      an output that matches the one or more predicates and comprises an output member;
   execute the query to obtain a subset of the online user community data matching the query; and
   provide the subset of the online user community data in response to the query; and
an indexing non-transitory computer readable medium comprising instructions that, when executed by the one or more processors, cause the system to:
   index selectively the online user community data by an attribute from the query, wherein said indexing comprises:
      identifying the attribute based on a search space of the query;
      creating an index of the attribute for a first node having a number of edges that exceeds a threshold to reduce the search space of the query; and
      omitting from the index a second node having a number of edges less than the threshold; and
   provide the indexed online user community data for use in executing the query.

17. The system of claim 16, wherein the one or more predicates comprise:
an employment of the one or more output members at the input company; and
an overlap of employment at a common company between the first input member and the one or more output members.

18. The system of claim 16, wherein:
the two or more input nodes comprise the first input member and a second input member;
the output comprises members in a four-hop path between the first and second input members; and
the one or more predicates comprise a minimum connection strength of edges in the four-hop path.

19. The system of claim 16, wherein:
the two or more input nodes comprise the first input member and a second input member;
the output further comprises an output school and an output company in a four-hop path between the first and second input members; and
the one or more predicates comprise:
   an education of the first input member and the one or more output members at the output school; and
an employment of the second input member and the one or more output members at the output company at the same time.

* * * * *